(12) United States Patent
Lee et al.

(10) Patent No.: US 9,887,871 B2
(45) Date of Patent: Feb. 6, 2018

(54) METHOD AND APPARATUS FOR AUTOMATICALLY SHARING AN APPLICATION AMONG A PLURALITY OF CLIENTS

(75) Inventors: Kyung-Tak Lee, Gyeonggi-do (KR); Wuk Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 291 days.

(21) Appl. No.: 13/995,023

(22) PCT Filed: Dec. 19, 2011

(86) PCT No.: PCT/KR2011/009809
§ 371 (c)(1),
(2), (4) Date: Jun. 17, 2013

(87) PCT Pub. No.: WO2012/081950
PCT Pub. Date: Jun. 21, 2012

(65) Prior Publication Data
US 2013/0268627 A1 Oct. 10, 2013

(30) Foreign Application Priority Data

Dec. 17, 2010 (KR) ........................ 10-2010-0130312

(51) Int. Cl.
*G06F 15/16* (2006.01)
*H04L 29/08* (2006.01)
(Continued)

(52) U.S. Cl.
CPC ........ *H04L 29/08306* (2013.01); *G06F 9/541* (2013.01); *H04W 4/001* (2013.01); *H04L 67/34* (2013.01); *H04W 4/206* (2013.01)

(58) Field of Classification Search
CPC ......... H04L 29/08306; H04L 29/08117; H04L 67/10; G06F 17/30864; G06F 17/30876; G06F 9/541
See application file for complete search history.

(56) References Cited

U.S. PATENT DOCUMENTS

| 7,739,658 B2 | 6/2010 | Watson et al. |
| 2002/0059480 A1* | 5/2002 | Matsuura ................. G06F 8/61 710/1 |

(Continued)

FOREIGN PATENT DOCUMENTS

| KR | 1020030043969 | 6/2003 |
| KR | 1020040079772 | 9/2004 |

(Continued)

OTHER PUBLICATIONS

PCT/ISA/237 Written Opinion issued on PCT/KR2011/009809 (pp. 5).

(Continued)

*Primary Examiner* — Arvin Eskandarnia
*Assistant Examiner* — Austin Moreau
(74) *Attorney, Agent, or Firm* — The Farrell Law Firm, P.C.

(57) ABSTRACT

A method for automatically sharing an application among a plurality of clients according to the present invention comprises the following processes: receiving, from a request client, an application share request signal for sharing an application with an object client; receiving information on the capability of the object client; determining whether the application for which sharing has been requested and the object client are compatible with each other using the receiving information on the capability of the object client; and providing the object client with the application for which sharing has been requested in accordance with the result of the determination.

27 Claims, 9 Drawing Sheets

(51) Int. Cl.
*G06F 9/54* (2006.01)
*H04W 4/00* (2009.01)
*H04W 4/20* (2009.01)

(56) References Cited

U.S. PATENT DOCUMENTS

| | | | |
|---|---|---|---|
| 2004/0044774 A1* | 3/2004 | Mangalik | H04L 67/2819 709/227 |
| 2005/0071674 A1* | 3/2005 | Chou et al. | 713/201 |
| 2005/0226166 A1 | 10/2005 | Agrawal et al. | |
| 2006/0048141 A1* | 3/2006 | Persson | G06F 8/61 717/176 |
| 2006/0200571 A1 | 9/2006 | Backman | |
| 2007/0220575 A1 | 9/2007 | Cooper et al. | |
| 2010/0325208 A1* | 12/2010 | Chitturi et al. | 709/204 |
| 2011/0078573 A1* | 3/2011 | Ooba | 715/733 |
| 2011/0320307 A1* | 12/2011 | Mehta et al. | 705/26.7 |
| 2012/0062712 A1* | 3/2012 | Kesseler et al. | 348/56 |
| 2012/0066746 A1* | 3/2012 | Larsen | 726/4 |
| 2012/0110568 A1* | 5/2012 | Abel et al. | 717/178 |

FOREIGN PATENT DOCUMENTS

| | | |
|---|---|---|
| KR | 1020060097568 | 9/2006 |
| KR | 1020080107454 | 12/2008 |
| WO | WO 2009/060393 | 5/2009 |

OTHER PUBLICATIONS

PCT/ISA/210 Search Report issued on PCT/KR2011/009809 (pp. 3).
Korean Office Action dated Sep. 27, 2016 issued in counterpart applicaton No. 10-2010-0130312, 15 pages.
European Search Report dated Apr. 26, 2017 issued in counterpart applicaton No. 11849395.6-1870, 14 pages.

* cited by examiner

METHOD AND APPARATUS FOR AUTOMATICALLY SHARING AN APPLICATION AMONG A PLURALITY OF CLIENTS

PRIORITY

The present application claims priority under 35 U.S.C. §365 to International Patent Application No. PCT/KR2011/009809 filed Dec. 19, 2011, and under 35 U.S.C. §119(a) to Korean Patent Application No. 10-2010-0130312 filed Dec. 17, 2010, which are incorporated herein by reference.

TECHNICAL FIELD

The present invention relates generally to an application sharing method, and more particularly, to a method and apparatus for sharing an application among clients that operates under different operating systems.

BACKGROUND ART

Mobile communication terminals, such as existing cellular phones was used for simple voice calls, message exchange, etc.; however, with wide-spread smartphones, tablet PCs, notebooks, etc., recent mobile communication terminals enable users to get information he/she wants and to exchange information and media with other users anytime and anywhere.

Conversation or information exchange in texting and multimedia service using the mobile communication terminals have become more significant, and in particular, with significant growth of smartphones, users may enjoy not only voice calls or message exchanges but also application services by downloading and installing them.

DISCLOSURE

Technical Problem

Users of mobile terminals, such as smartphone users sometimes recommend their friends or co-workers to use a particular application while using the application. In that case, the user inform the other party of e.g., a title of the application through direct conversation or message exchange with the other party, to enable the other party to access a server that provides the application, such as the Appstore or the Market that provides application downloading services and install the application. However, the other party may have difficulty installing the recommended application because he/she is unfamiliar with operations of his/her smartphone, or even if the other party is familiar with the operation of the smartphone, it is cumbersome that the other party has to manually access the Appstore or the Market to search and download the application. Furthermore, if the user uses a different smartphone operating system from that of the other party, he/she may not know whether the recommended application is also supported by the other party's system.

Technical Solution

To address the foregoing problems, the present invention provides a method and apparatus for automatically sharing an application among clients under different system environments.

In accordance with an aspect of the invention, provided is a method of automatically sharing an application among a plurality of clients, the method including: receiving from a requesting client a share request signal for an application to be shared with a target client; receiving capability information of the target client; determining whether the application requested to be shared is compatible in the target client based on the capability information; and providing the application requested to be shared to the target client based on the determination, wherein if it is determined that the application requested to be shared is not compatible in the target client, further including: requesting the application, which is compatible in the target client, from an application provider of the target client; and upon reception of the application, which is compatible in the target client, at the request, providing the received application to the target client, wherein if it is determined that the application requested to be shared is compatible in the target client, further including: providing the application to be shared to the target client, wherein the share request includes information regarding the requesting client's operating system, information regarding the application to be shared, and information regarding at least one target client, and wherein the information regarding the application to be shared includes information about the title, identification ID, operating system, developer, address in which to access the application, and price of the application, wherein if it is determined that the application requested to be shared is not compatible in the target client, requesting the application, which is compatible in the target client, from an application provider of the target client includes, if it is determined that the application requested to be shared is not compatible in the target client, requesting and receiving access information to access the application provider of the target client from the target client; and requesting the application, which is compatible in the target client, from the application provider of the target client, using the access information, wherein receiving capability information of the target client includes determining whether the target client approves the share request; and receiving the application to be shared if the target client approves the share request, and requesting and receiving the capabilities of the target client, including operating system information of the target client, from a terminal capabilities manager server.

In accordance with another aspect of the invention, provided is an apparatus for automatically sharing an application among a plurality of clients, the apparatus including: a transceiver for receiving from a requesting client a share request signal for an application to be shared with a target client, and for receiving capability information of the target client; a compatibility determiner for determining whether the application requested to be shared is compatible in the target client based on the capability information; and a controller for controlling the application requested to be shared to be provided to the target client based on the determination of the compatibility determiner.

In accordance with another aspect of the invention, provided is a sharing method in a client for automatic application sharing among a plurality of clients, the sharing method including: receiving from a user a share request for a particular application; generating an application share request message which corresponds to the received share request for the particular application; sending the application share request message to a sharing server; receiving an application share result; and displaying the application share result.

In accordance with another aspect of the invention, provided is a sharing method in a client for automatic application sharing among a plurality of clients, the sharing method including: receiving from a sharing server share request notification which notifies that there has been a share request for an application; displaying the share request notification; notifying the sharing server that the share request is approved, if there has been an input of approval from a user for the share request; and receiving from the sharing server the application requested to be shared.

In accordance with another aspect of the invention, provided is a client device to be used for automatically sharing an application among a plurality of clients, the client device including: a transceiver that communicates with a sharing server; a display unit that displays an application share request notification and an application share result; a share request generator that generates the application share request if a command to share an application has been received; and a controller for controlling the share request generator to generate an application share request message if a command to share an application has been received; for sending the application share request message to the sharing server; and for controlling a share result to be displayed, if receiving the share result from the sharing server; for controlling an application share request notification to be displayed if the application share request notification that notifies that there has been a request to share an application is received from the sharing server, and upon reception of approval for the share request, notifying the sharing server of the approval and controlling the application requested to be shared to be received from the sharing server.

Advantageous Effects

The present invention has an advantage of enabling a user who wants to recommend an application to easily share the application with the other party without having to know what operating system the other party's client uses.

In addition, a recipient who gets the recommendation about an application may automatically receive the recommended application if the recipient's system supports the application even if the recipient's system is different from that of a person who recommends the application, thus easily installing the recommended application even if the recipient is unfamiliar with terminal operations and does not know how to access and download the application.

DESCRIPTION OF DRAWINGS

The above and other objects, features and advantages of certain embodiments of the present invention will be more apparent from the following detailed description taken in conjunction with the accompanying drawings, in which.

BEST MODE

Reference will now be made in detail to the preferred embodiments of the present invention with reference to the accompanying drawings. Also, wherever possible, the same reference numbers will be used throughout the drawings and the specification to refer to the same or like parts.

An apparatus and operational method of embodiments of the invention will be described in detail below with reference to the accompanying drawings. In the following descriptions, particular things, such as specific elements are provided below to facilitate better understanding of the present invention; however, it is obvious to the skilled person in the art that numerous alterations and modifications to them may be made within the scope of the present invention, Descriptions of some well-known technologies that could possibly obscure the invention will be omitted.

The detailed description described below will present representative embodiments of the present invention in order to achieve the foregoing technological objectives. For convenience of explanation about the present invention, the same terminologies as entities defined by the Open Mobile Alliance (OMA, a standard body that develops open standards for the mobile phone industry) Converged Address Book (CAB) will be used herein, but the present invention is not limited thereto and may be applied for other systems with a similar technical background.

Figure 1:
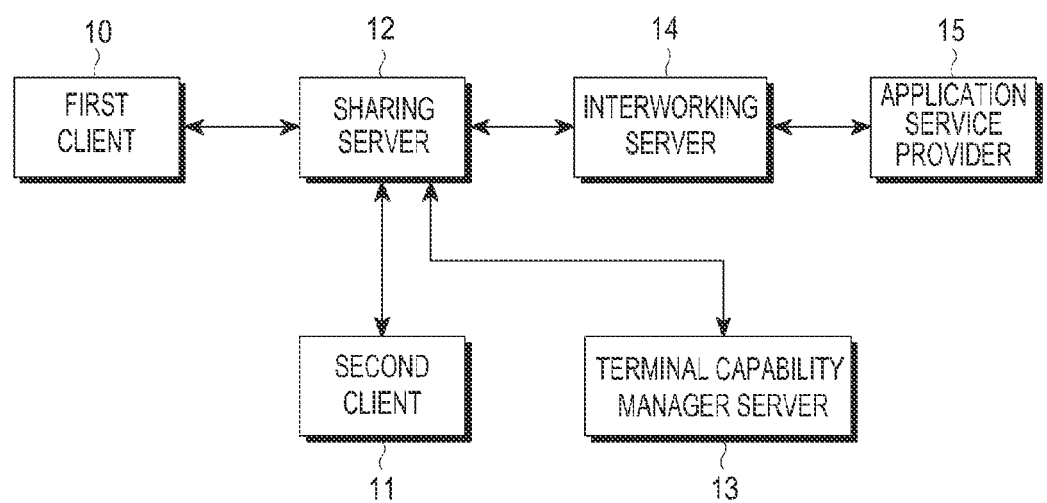
FIG. 1 illustrates a system configuration for application sharing between clients under different system environments, according to an embodiment of the present invention.

An exemplary embodiment of a system for application sharing among clients under different system environments will be examined below with reference to FIG. 1. FIG. 1 illustrates a system for application sharing between clients under different system environments, according to an embodiment of the invention.

Referring to FIG. 1, the system includes a first client 10, a second client 11, a sharing server 12, an interworking server 14, a terminal capability manager server 13, and an application service provider 15.

The first client 10 is a requesting terminal for application sharing, and the second client 11 is a target terminal with which to share the application requested by the first client 10.

The first client 10 and the second client 11 each forward user requests to the sharing server 12 and serve to notify the user of content to be shared (e.g., an application to be shared) or events received from the sharing server 12 by displaying the content or the events. In an embodiment of the invention, a CAB service is described as an example of a sharing service. In the embodiment, the first client 10 and the second client 11 operate as CAB clients.

The sharing server 12 fulfills user requests received from the first client 10 and the second client 11. The sharing server 12 also forwards content to be shared or an event received from the interworking server 14 or any other network to the first client 10 and the second client 11.

The terminal capability manager server 13 is a server to store and mange information regarding each terminal. For example, the terminal capability manager server 13 may know of each terminal's screen size or highest screen resolution, or operating system (OS). In an embodiment, the terminal capability manager server 13 provides such information to the sharing server 12 upon request from the sharing server 12.

The interworking server 14 serves as a gateway to link the sharing server 12 to the application service provider 15 and serves as an intermediate medium to e.g., perform suitable format conversion between the sharing server 12 and the application service provider 15. If the system is actually implemented, the interworking server 14 may be co-located with the sharing server 12 or may be incorporated as an internal element of the sharing server 12.

The application service provider 15 is an agency that stores and provides various applications. For example, it refers to the Apple App store or the Android Market. In the embodiment of the invention, the application service provider 15 is assumed to be a provider for an operating system (e.g., Android OS) of the second client 11.

Figure 2:
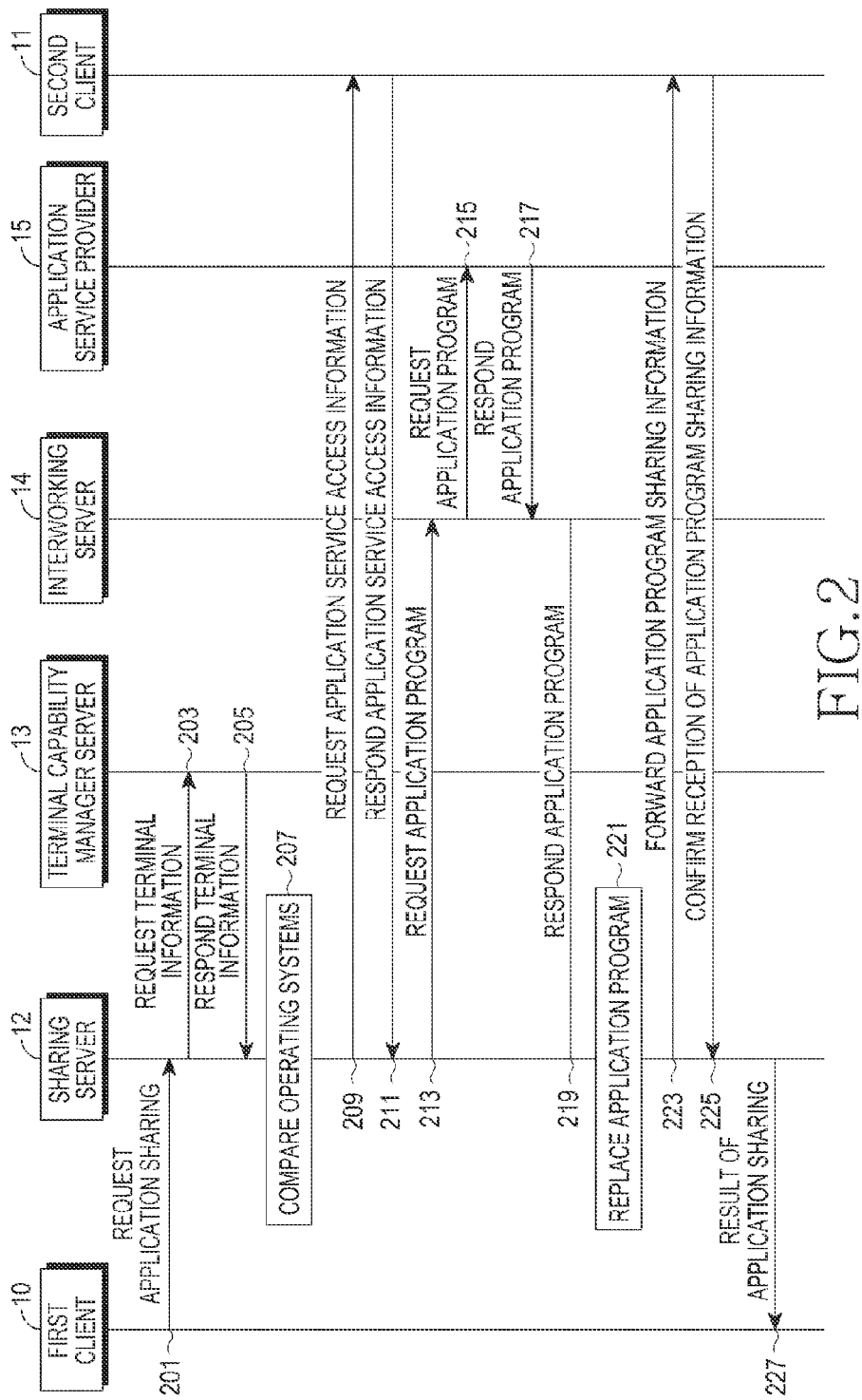
FIG. 2 illustrates flows of operations for application sharing between clients under different system environments, according to an embodiment of the present invention.

In the system as illustrated in FIG. 1, application sharing operations between clients under different system environments will now be described. FIG. 2 illustrates flows of application sharing operations between clients under different system environments, according to an embodiment of the invention.

In the embodiment of FIG. 2, there are several assumptions as will be described below. First, the first client 10 and the second client 11 operate under different OSs, and the first client 10 has already downloaded an application its user wants to share from a corresponding provider.

The application that the first client 10 wants to share may be provided by the application service provider 15 in a version which is compatible with the operating system of the second client 11. A user B's terminal, which is the second client 11, has subscribed to a service for downloading the application provided by the application service provider 15 and thus, has access information to the service for downloading the application.

Referring to FIG. 2, at step 201, the first client 10 sends a request to the sharing server 12 to share at least one of applications owned by the first client 10 with the second client 11. This share request includes information regarding an operating system of the first client 10 and information regarding the second client 11 with which to share the application. The information regarding the second client 11 is configured in the form of a list, and the list includes an address of at least one recipient (e.g., URI, or identification information) with which to share the application.

The share request also includes information regarding an application to be shared, the information having information regarding a title, identity, operating system (e.g., Android 2.2), developer (or a company), address in which to access the application, and price of the application.

The share request may also include data of the application.

Upon reception of the share request, the sharing server 12 sends a request for terminal capability information of the second client 11 to the terminal capability manager server 13, at step 203, in order to determine if the application to be shared is compatible in the operating system of the second client 11. At step 205, the terminal capability manager server 13 sends the requested terminal capability information to the sharing server 12. At step 207, based on the received terminal capability information, the sharing server 12 compares the operating system of the first client 10 with the operating system of the second client 11 and determines whether they are compatible with each other.

With the foregoing assumptions before the description of FIG. 2, since the first client 10 and the second client 11 have different operating systems, the sharing server 12 requests access information (e.g., login ID, Password) to the application service provider 15 from the second client 11 at step 290, in order to find a corresponding program that suits the operating system of the second client 11. At step 211, the second client 11 forwards the requested access information to the sharing server 12. To enhance security, the access information may be encrypted before being sent. Alternatively, if the sharing server 12 already has the access information of the second client 11, steps 209 to 211 may be skipped.

At step 213, the sharing server 12 sends a request for the application to be shared in a version compatible in the operating system of the second client 11 to the interworking server 14, using the access information received at the previous step. At step 215, the interworking server 14 converts the received request into a format to be understood by the application service provider 15, accesses the application service provider 15, and requests the corresponding application from the application service provider 15. Upon reception of the request, the application service provider 15 sends the requested application to the interworking service server 14, at step 217. Since the requested application may not be received at once at steps 215 to 217 due to an access method provided by the application service provider 15, interactions between the interworking service server 14 and the application service provider 15 may be repeated several times.

Upon reception of the application, the interworking service server 14 converts a response into a format to be understood by the sharing server 12 and at step 219, sends the response in the format to the sharing server 12. At step 221, the sharing server 12 replaces the application to be shared, which was included in the request received at step 201, with the application received at the previous step.

At step 223, the sharing server 12 sends the replacement application with information regarding the received share request to the second client 11, and the second client 11, upon reception of the application to be shared and the information, sends a reception acknowledgment message to the sharing server 12, at step 225. Finally, at step 227, the sharing server 12 forwards a result of the application share request received at step 201 to the first client 10. The result of the application share request includes all information included in the original share request and information regarding whether each target client shares the application, and information regarding the replacement application instead of the original application if the application is replaced at step 221. Information that the application has been replaced may be further included.

The operations described in connection with FIG. 2 may be provided based on Open Mobile Alliance (OMA) Converged Address Book (CAB), which is an example of an enabler that provides an address book convergence function as another embodiment of the invention. Before describing the another embodiment, configuration of a general CAB system used in the present invention will be examined in connection with FIG. 3.

Figure 3:
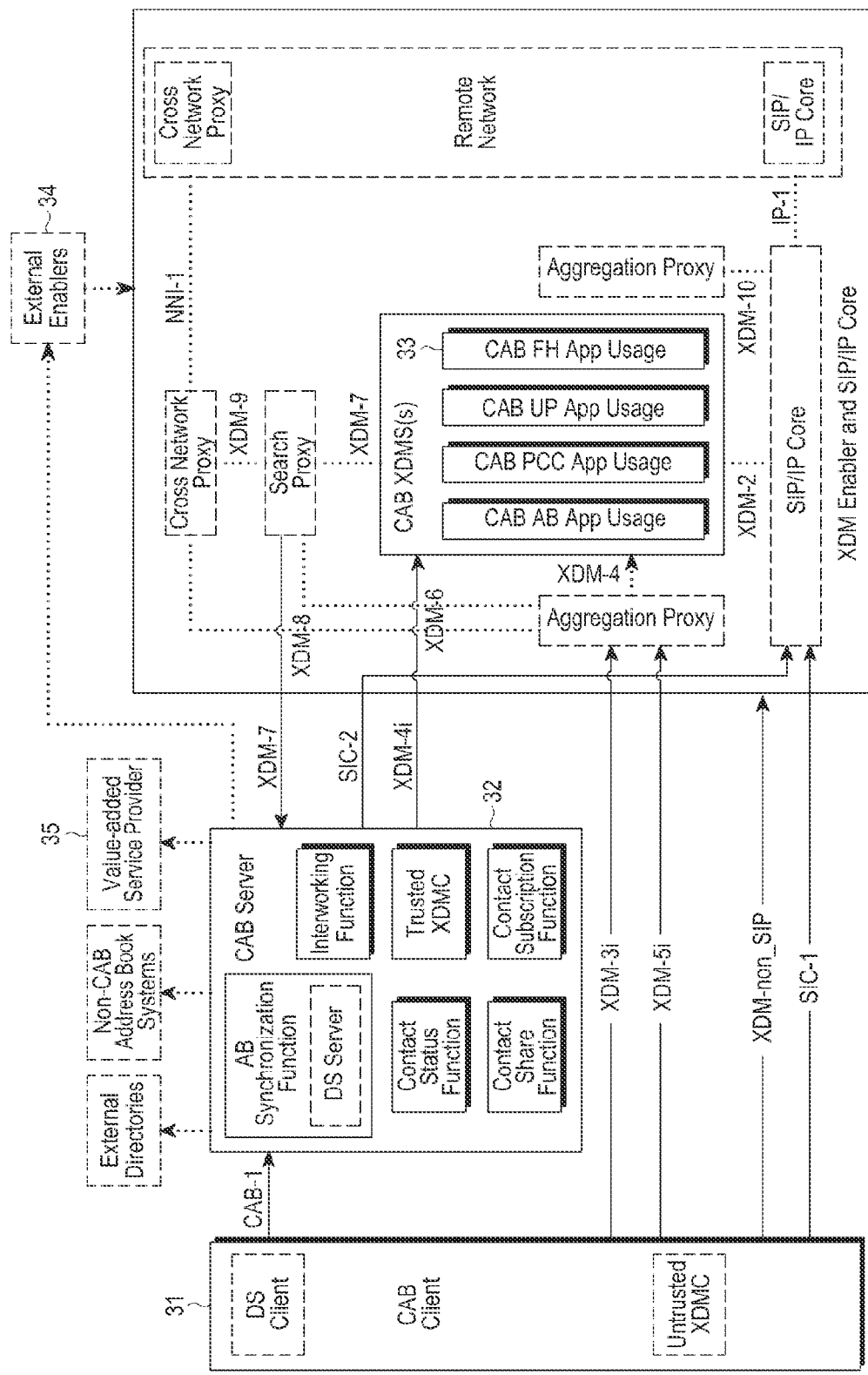
FIG. 3 illustrates a system configuration for application sharing between clients under different system environments, according to another embodiment of the present invention.

FIG. 3 illustrates a CAB system configuration for application sharing between clients under different system environments, according to the another embodiment.

Referring to FIG. 3, a CAB client 31 includes an application to manage and control an address book in a user's terminal.

A CAB server 32 is a network element that fulfills various user requests received from the CAB client 31. Especially, the CAB server 32 includes an interworking function that enables the CAB system to work with any other system.

A CAP FH (Feature Handler) application usage 33 is a server to store and manage user's particular requests.

External enablers 34 include all OMA enablers that do not support the CAB service. The terminal capability manager server 13, as illustrated in FIG. 1, may be included in the external enablers 34.

Furthermore, in the second embodiment, an element named value-added service provider 35 is added. The element includes value-added service providers, which are not included in the CAB service. The application service provider 15, as illustrated in FIG. 1, may be assumed to be included in the value-added service provider 35.

Interfaces and protocols/technologies to be used in the another embodiment are described below.

SIC-1 interface is used to notify the CAB client 31 of changes whenever data stored in the CAB FH application usage 33 is changed. SIP (Session Initiation Protocol)-Specific Event Notification [1] is used as a protocol/technology.

SIC-2 interface is used to notify the CAB server 32 of changes whenever data stored in the CAB FH application usage 33 is changed. SIP (Session Initiation Protocol)-Specific Event Notification [1] is used as a protocol/technology.

XDM-3i interface is used when the CAB Client 31 manages data stored in the CAB FH Application Usage 33. XCAP/HTTP (XML Configuration Access Protocol/Hyper Text Transfer Protocol) [2] is used as a protocol/technology.

XDM-4i interface is used when the CAB server 32 manages data stored in the CAB FH Application Usage 33. XCAP/HTTP (XML Configuration Access Protocol/Hyper Text Transfer Protocol) [2] is used as a protocol/technology.

In the present invention, the CAB service 32 also newly defines an interface to access the external enablers 34 and an interface to access the value-added service provider 35.

Figure 4:
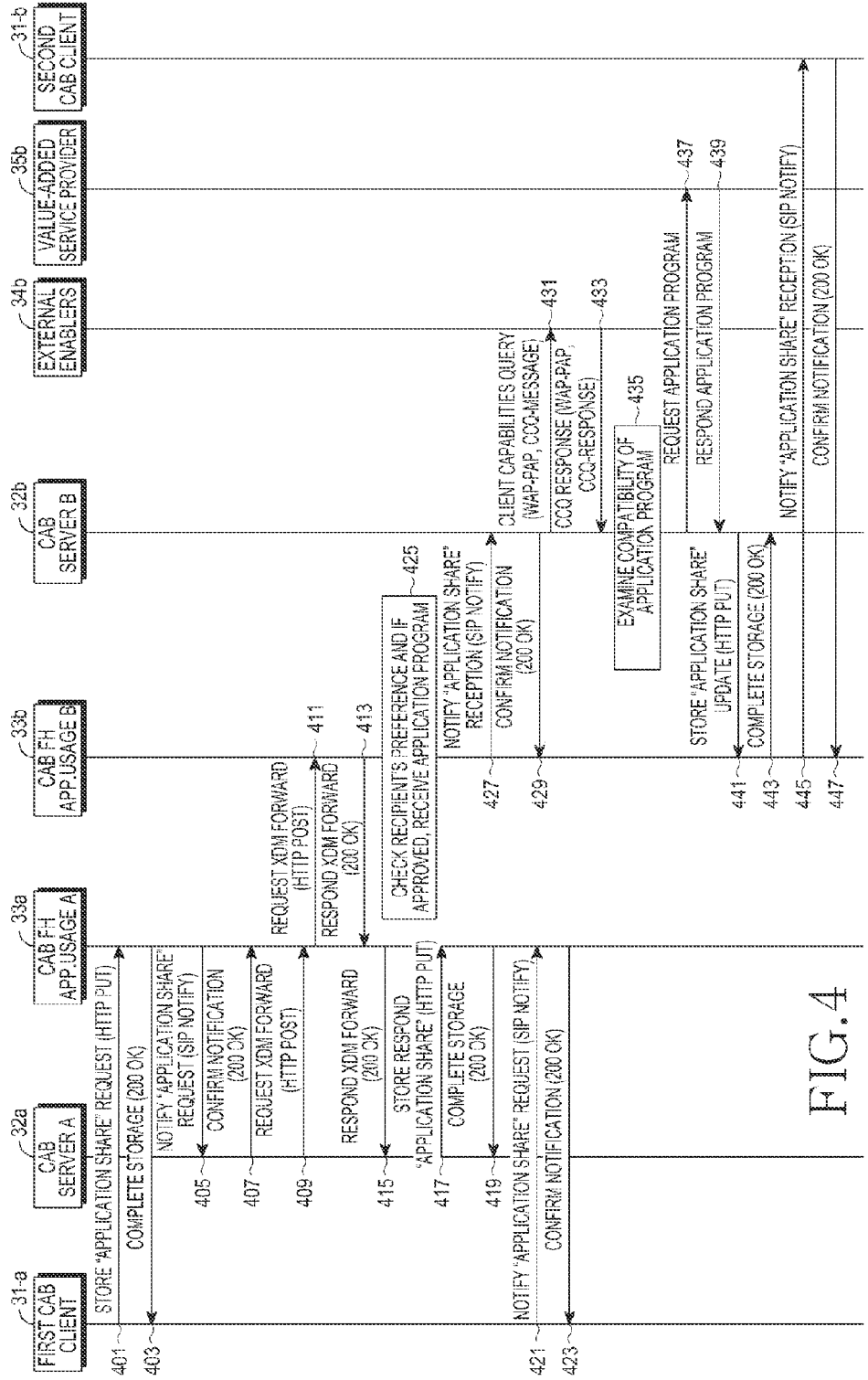
FIG. 4 illustrates flows of operations for application sharing between clients under different system environments, according to another embodiment of the present invention.

In the following description, another embodiment of the invention will be described where the operations of FIG. 2 are based on the system of FIG. 3. FIG. 4 illustrates flows of operations for application sharing between clients under different system environments, according to the another embodiment.

FIG. 4 illustrates an occasion when the application server 12 and the interworking server 14 of FIG. 2 are implemented in unity. For convenience of explanation, elements for routing and other purposes, e.g., SIP/IP Cores, IMS, Aggregation Proxy, etc. are omitted herein, but it may be assumed that some operations may go through the elements as necessary.

Referring to FIG. 4, a first CAB client 31a requests a CAB FH application usage A 33a to store detailed information about the share request in a document named "CAB feature handler" managed by the CAB FH application usage A 33a in order to deliver an application that the user wants to share. To do this, at step 401, the application share request is sent to the CAB FH application usage A 33a in the XCAP/HTTP PUT format. The document named CAB feature handler will be described in more detail later.

At step 403, the CAB FH application usage A 33a stores requests in the CAB feature handler managed by itself, and sends 200 OK, which is a storage complete response, to the first CAB client 31a.

Next, at step 405, the CAB FH application usage A 33a notifies the CAB server A 32a of the requests and information of the first CAB client 31a stored in the CAB feature handler. For this notification, a SIP Notify message is used. Then, at step 407, the CAB server A 32a receives the notification and sends an acknowledgment message, 200 OK to the CAB FH application usage A 33a.

Subsequently, at step 409, the CAB server A 32a requests the CAB FH application usage A 33a to deliver the application to the receiving side. XDM Forward [5] method regulated by the OMA may be used herein, and thus the XDM Forward uses an HTTP POST based protocol, XDCP (XDM Command Protocol).

At step 411, if the CAB FH application usage A 33a forwards the XDM Forward request to a network on the receiving side in the XDM Forward method (HTTP post based XDCP), the CAB application usage B 33b receives the forward request. In this case, the request is not sent directly but via additional elements (e.g., aggregation proxy, cross network proxy, etc.) for forwarding the request to any other network, but the additional elements are omitted in this embodiment for convenience of explanation. At step 413, the FH application usage B 33b sends the FH application usage A 33a the acknowledgment message, 200 OK, in response to the application delivery request.

At step 415, the FH application usage A 33a, upon reception of the acknowledgment message, sends the acknowledgment message 200 OK to the CAB server 32a in response to the XDM Forward request received at step 409. The CAB server A 32a that has become to know that the application delivery request was fulfilled all right requests the FH application usage A 33a to store the response to the "application share" request at step 417, in order to notify the first CAB client 31a that requested "application share" at step 401 of the result. For this store request, HTTP PUT is used. At step 419, the FH application usage A 33a stores the received response, sends 200 OK as an acknowledgment response to the CAB server 32, and at step 421, notifies the first CAB client 31a of the response in SIP Notify. At step 423, the first CAB client 31a receives the response and sends the acknowledgment message 200 OK to the FH application usage A 33a.

A procedure of sharing an application service program at the network on the receiving side will be described below. The procedure may proceed immediately after step 413 without having to wait until steps 415 to 423, which is the sharing procedure at the network on the transmitting side, are completed.

In the XDM Forward request received by the FH application usage B 33b at step 411, no actual application to be shared is included but sharing intention and the program location address (e.g., URL) from which to actually receive the application are included. However, it may be configured that the application to be shared is to be directly delivered in the XDM Forward request.

After sending a response to the XDM Forward request at step 413, the FH application usage B 33b checks the recipient's preference and if the recipient approves for program reception, receives the application using the received location address of the application at step 425.

The FH application usage B 33b notifies the CAB server B 32b that the FH application usage B 33b received the application to be shared in the SIP Notify message at step 427, and the CAB server 32b sends the FH application usage B 33b the acknowledgment of the notification in the 200 OK message at step 429.

Then, at step 431, the CAP server 32b requests capability information regarding the second CAB client 31b from the external enablers 34b in order to check if the application to be shared is compatible in the second CAB client 31b. UAProf [3] enabler function regulated by the OMA may be used herein. Thus, the CAB server B 32b serves as a "push initiator" to send ccq-message (ccq: client capabilities query) to a "push proxy gateway" on the external enablers 34b side. At this time, a protocol to be used is PAP (Push Access Protocol) [4] regulated by WAP (Wireless Application Protocol) Forum. Upon reception of this message, the push proxy gateway on the external enablers' 34b side confirms the capability information regarding the terminal, which is the second CAB client 31b, and then sends the capability information to the CAB server 32b by including the information in ccq-response.

Upon reception of the capability information regarding the second CAB client 31b, the CAB server B 32b examines whether the application to be shared is compatible in the second CAB client 31b, at step 435. In addition to the compatibility of the application to be shared in the second CAB client 31b, other compatibility may also be examined. In an embodiment of the invention, it is assumed that the application to be shared is not compatible in the second CAB client 31b. Thus, at step 437, the CAB server B 32b requests the same application, which is instead compatible in the second CAB client 31b from the value-added service provider 35b, the application service provider to provide applications compatible in the second CAB client 31b. In this request, information to identify the application may be included. For example, at least one of program title, program developer, program developing company, program type, etc., may be included. Information for access to the value-added service provider 35b, such as login and password information is also included. In the embodiment of the invention, the CAB server B 32b is assumed to already store the access information of the second CAB client 31b and include the access information in the request. If the CAB server B 32b does not have the access information, the CAB server B 32b first sends a request for the access information to the second CAB client 31b and in return receives the access information, as described at steps 209 to 211 of FIG. 2. The value-added service provider 35b, upon reception of the request, determines whether there is a corresponding program compatible in the second CAB client 31b and if yes, sends the corresponding program to the CAB server B 32b.

The CAB server B 32b, upon reception of the compatible program, sends a request to store an "application share" to the CAB FH application usage B 33b at step 441, in order to replace the incompatible application with the compatible program. For this, HTTP PUT message is used. The CAB FH application usage B 33b stores received update information, and sends a storage complete response, 200 OK to the CAB server B 32b at step 443.

Lastly, at step 445, the CAB FH application usage B 33b delivers updated program to be shared to the second CAB client 31b in the SIP Notify message, and the second CAB client 31b, upon reception of the program to be shared, sends the 200 OK message that confirms the reception to the CAB FH application usage B 33b.

In the embodiment of the invention, the process that the first CAB client 31a sends the program to be shared to the network on the receiving side and the network directly converts the program to a compatible program and delivers the compatible program to the second CAB client 31b was described. However, in another embodiment of the invention, rather than direct delivery of the program to be shared, only an address (e.g., URL) in which to access the program to be shared may be delivered, and if the program to be shared is not compatible in the second CAB client 31b, the address may be replaced by an address at which to access the same program, which is instead compatible in the second CAB client 31b, which may then be sent to the second CAB client 31b. Thus, the second CAB client 31b may use the received address to access and receive the program to be shared stored in the value-added service provider 35b.

Content of the "application share" to be inserted in the "CAB feature handler" document explained at step 401 will be described below.

In the present invention, an element <application-share> is defined. The element <application-share> is included in the "CAB feature handler" document for the first CAB client to deliver an application to be shared. The lower level of the element consists of elements <recipients-list>, <note><application>, <data>, <id>, etc.

First, <recipients-list> is an element into which to write with which users the application will be shared. The lower level of this element is comprised of <list>, and the lower level of the element <list> consists of one or more elements <entry>. In each element <entry>, an address (e.g., URI) of each recipient with which to share the application is written. If there are three recipients with which to share the application, three <entry> elements are written.

<Note> includes a message that the sender wants to send to the recipient.

<Application> includes information regarding the application to be shared. The lower level of this element includes sub-elements <name>, <id>, <platform> (or <operating-system>), <source>, <address> (or <url>), <cost>, etc. <Name> is a title of the application to be shared; <id> is identification of a program; <platform> is an operating system (e.g., Android 2.2) based on which to run the application; <source> is a name of the application developer (e.g., a name of a company that developed a game if the application is the game software); <address> (or <url>) is an address in which to access the application; and <cost> is the price of the application.

<data> is an element that includes the application itself.

As an element into which to write an agency desired to get a new contact, e.g., a domain name element may further be included. This element is established based on the service provider's policies.

<id> is an identity that identifies each request.

Content of the element <application-share> is forwarded straight to the recipient except the application data included in <data>. The application data may be replaced by an address in which to access the application on the sender's side.

The existing XDM Forward [5] method is used at steps 409 to 415, and content that results when the response to "application share" request of step 471 is stored will be described below. This part is also stored in the lower level of the element <application-share> of the foregoing "CAB feature handler" document.

<Response> is an element that includes a response and includes <code> and <phrase> in its lower level. <Code> refers to a response code for the response, e.g., 200 OK, and <phrase> includes description text that corresponds to the response.

Content to be checked as the recipient's preference by the CAB FH application usage B 33b is brought from preferences described in the XDM Forward [5] technology. An element <actions> in particular, in the lower level of an element <forward-prefs>, may include one of sub-elements <accept>, <confirm>, and <reject>. When the element <actions> includes the sub-element <accept>, the CAB FH application usage B 33b automatically accept the XDM Forward request without need for separate approval of the recipient, receives the application present in the sender network and stores the application. When the element <actions> includes the sub-element <confirm>, the CAB FH application usage B 33b first notifies the recipient, seeks the recipient's approval and only if the recipient approves, performs such actions. When the element <actions> includes the sub-element <reject>, i.e., if the application size is too big, the CAB FH application usage B 33b automatically rejects the XDM Forward request.

Figure 5:
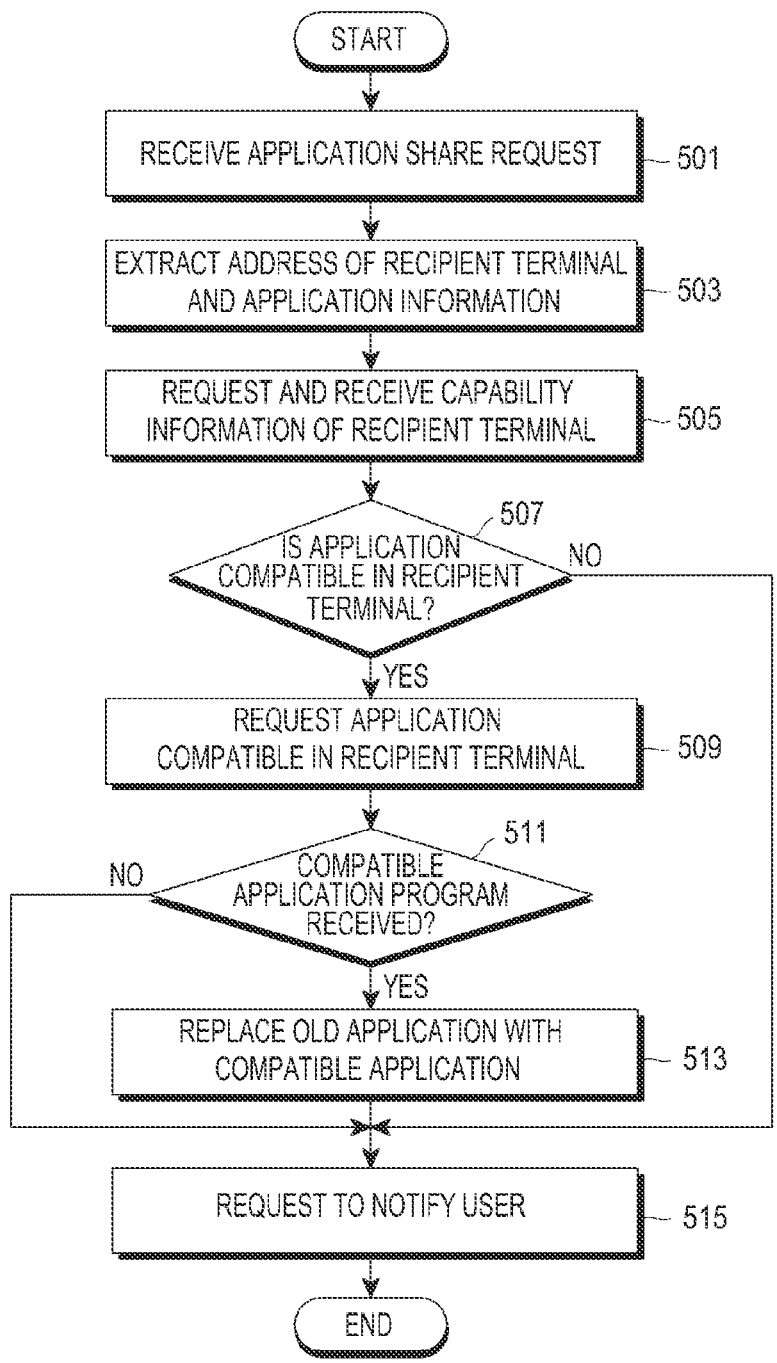
FIG. 5 illustrates flows of server operations in application sharing between clients under different system environments, according to an embodiment of the present invention.

FIG. 5 illustrates flows of server operations in application sharing between clients under different system environments, according to an embodiment. In FIG. 5, steps 427 to 443 of FIG. 4 are described in conjunction with the operation of the CAB server B 32b. Transmission and reception of common acknowledgment message, e.g., 200 OK, will be omitted herein.

Referring to FIG. 5, upon reception of a request to share an application (or application share request) at step 501, the CAB server B 32b extracts identification information (e.g., an address) of a recipient terminal (e.g., the second CAB client 31b) and information regarding the shared application from the request at step 503. At step 505, the CAB server 32b requests capability information of the recipient terminal using the extracted identification information and receives the capability information of the recipient terminal, at step 505. The CAB server B 32b determines whether the capability information is compatible with the information regarding the application extracted at step 503. For example, the CAB server B 32b determines whether received information about an operating system of the application matches the information about the terminal operating system. If compatible, the process proceeds to step 515, where the CAB server B 32b requests to notify the recipient, i.e., the second CAB client 31b, of the received share request and ends the process, if not compatible, the process proceeds to step 509, where the CAB server B 32b requests an application compatible in the recipient terminal, using the application information extracted at step 503 and the terminal information received at step 505. If a response to the request is received at step 511, the CAB server B 32b determines whether there is the compatible application in the response. If there is no compatible application in the response, the CAB server B 32b determines that there is no version of the program to be shared, which is compatible in the second CAB client 31b, and proceeds to step 515, where the CAB server B 32b notifies the second CAB client that there is no compatible version of the program to be shared and ends the process.

If there is the compatible application in the response, the CAB server B 32b replaces the old application to be shared with the compatible application at step 513 and proceeds to step 515, where the CAB server B 32h requests to notify the user of the received share request and ends the process.

Figure 6:
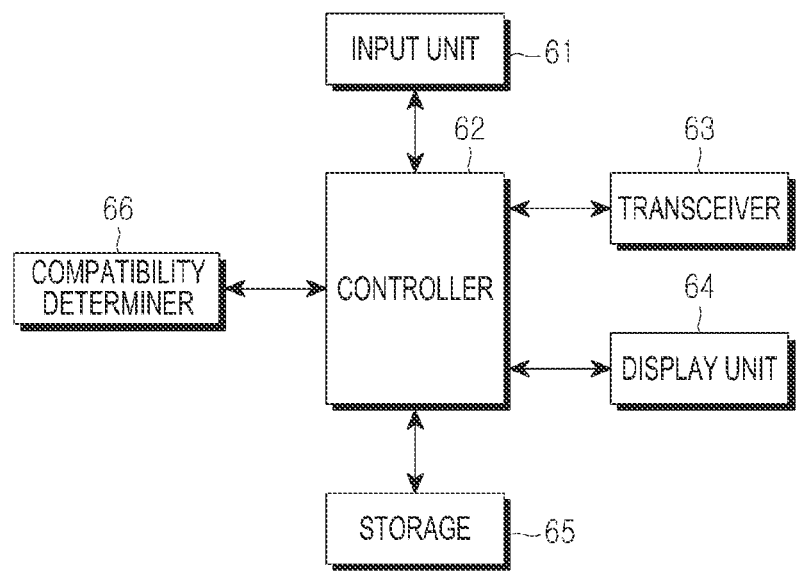
FIG. 6 is a block diagram of a sharing server for application sharing between clients under different system environments, according to an embodiment of the present invention.

FIG. 6 is a block diagram of the sharing server for application sharing between clients under different system environments, according to an embodiment. The sharing server includes a transceiver 63, a display unit 64, an input unit 61, a compatibility determiner 66, a storage 65, and a controller 62.

The transceiver 63 performs communication of the sharing server with the terminal capabilities manager server. In the embodiment, the transceiver 63 receives a share request signal for application to be shared with a target client from a requesting client which requests to share the application and receives capability information of the target client from the terminal capability manager server, under control of the controller 62. The share request that the transceiver 63 receives includes operating system information of the requesting client, information regarding the application to be shared, and information regarding the at least one target client. The information regarding the application to be shared includes information about the title, identification ID, operating system, developer, address in which to access the application, and price of the application.

The compatibility determiner 66 determines whether the application requested to be shared is compatible in the target client by using the capability information of the target client received from the terminal capability manager server, under control of the controller 62.

The controller 62 controls all components of the sharing server, and in an embodiment, controls the application requested to be shared to be provided to the target client based on the determination of the compatibility determiner 66.

Specifically, the controller 62 requests an application which is compatible in the target client from the application provider of the target client if the compatibility determiner 66 determines that the application requested to be shared is not compatible in the target client, and if the compatible application is received at the request, controls the compatible application to be provided to the target client.

If the compatibility determiner 66 determines that the application requested to be shared is compatible in the target client; the controller 62 controls the application to be provided to the target client.

In another embodiment, if the compatibility determiner 66 determines that the application requested to be shared is not compatible in the target client, the controller 62 requests and receives access information for accessing the application provider of the target client from the target client, and requests an application to be compatible in the target client from the application provider of the target client, using the received access information.

Upon reception of the capability information of the target client, the controller 62 notifies the target client that there has been the share request, determines whether the share request is accepted by the target client, and if the target client accepts the share request, receives the application to be shared and requests and receives capability information of the target client including the operating system of the target client from the terminal capability manager server.

The display unit 64 is comprised of an output means, such as LCD (Liquid Crystal Display), touch screen, etc., and outputs display content under control of the controller 62.

The input unit 61 receives user inputs through an input means, such as keyboard, mouse, touch screen, etc.

The storage 65 stores information required to operate the sharing server. In the embodiment of the invention, the storage 65 may store application information, clients' operating systems, etc.

Figure 7:
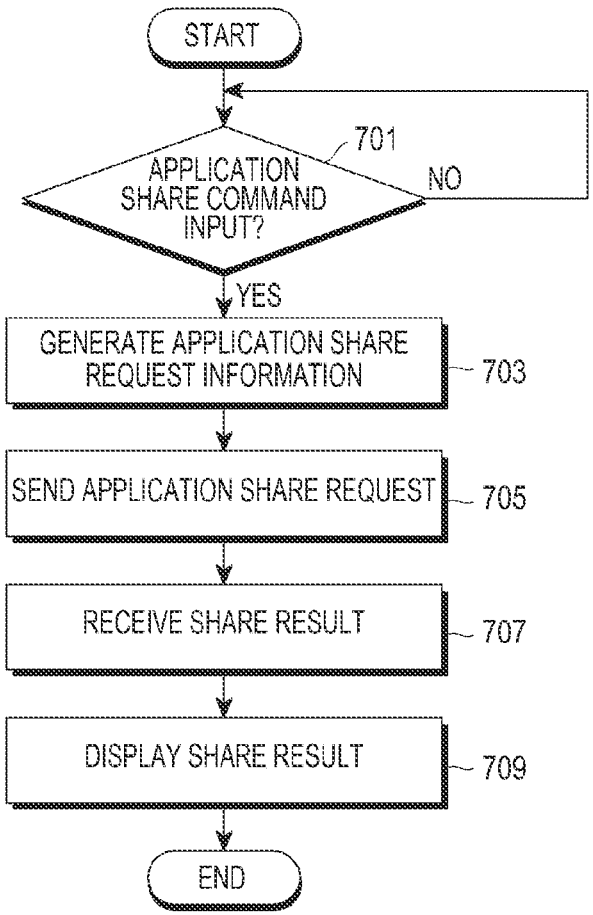
FIG. 7 illustrates flows of first client operations in application sharing between clients under different system environments, according to an embodiment of the present invention.

FIG. 7 illustrates flows of first client operations in application sharing between clients under different system environments, according to an embodiment.

Referring to FIG. 7, at step 701, the first client determines whether a command to share an application has been entered from the user. If there has been no such command entered, the first client waits for the command, or otherwise if there has been the command entered, the first client proceeds to step 703 to generate a request to share the application.

The request to share the application includes information regarding the first client's operating system, information regarding the application to be shared, and information regarding at least one second client. The information regarding the application to be shared includes information about the title, identification ID, operating system, developer, address in which to access the application, and price of the application.

At step 705, the first client sends the request to share the application to the sharing server that performs application sharing. The sharing server performs operations of application sharing with the second client. Upon completion of the application sharing at the sharing server, the first client receives the result of the application sharing from the sharing server at step 707, and displays the share result in the display unit at step 907 and ends the process. The share result includes a result of application sharing with each target client and information regarding the shared application.

Figure 8:
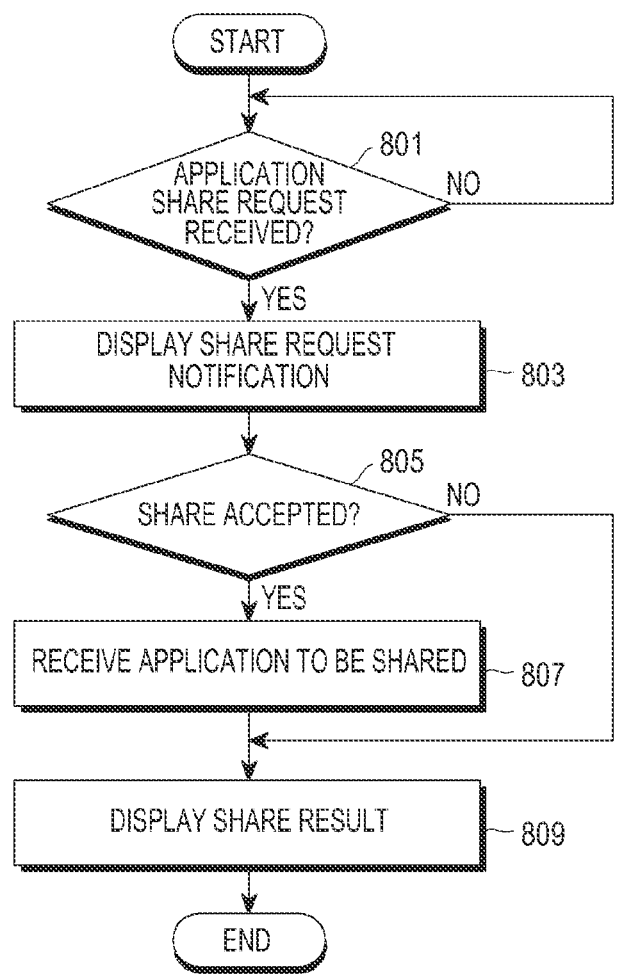
FIG. 8 illustrates flows of second client operations in application sharing between clients under different system environments, according to an embodiment of the present invention.

FIG. 8 illustrates flows of second client operations in application sharing between clients under different system environments, according to an embodiment.

Referring to FIG. 8, at step 801, a target client requested to share an application, which is the second client, determines whether it has received share request notification that notifies the second client that there has been a request to share the application from the sharing server. If there has been no such share request notification received, the second client waits for the share request notification, or otherwise if there has been the share request notification, proceeds to step 803 to display the received share request notification.

The share request notification includes information regarding the requesting client and information regarding the application to be shared, and the information regarding the application to be shared includes information about the title, identification ID, operating system, developer, address in which to access the application, and price of the application.

Next, at step 805, the second client determines whether there has been an input of approval from the user for the share request. If there has been the input of approval, the second client notifies the sharing server of the approval for the share request, and in return, receives the application to be shared at step 807. The second client may also receive information about the address in which to access the application instead of the application itself, at step 807. At step 809, the second client displays the share result and ends the process. The share result includes a result of sharing the application at the second client and information regarding the shared application.

Figure 9:
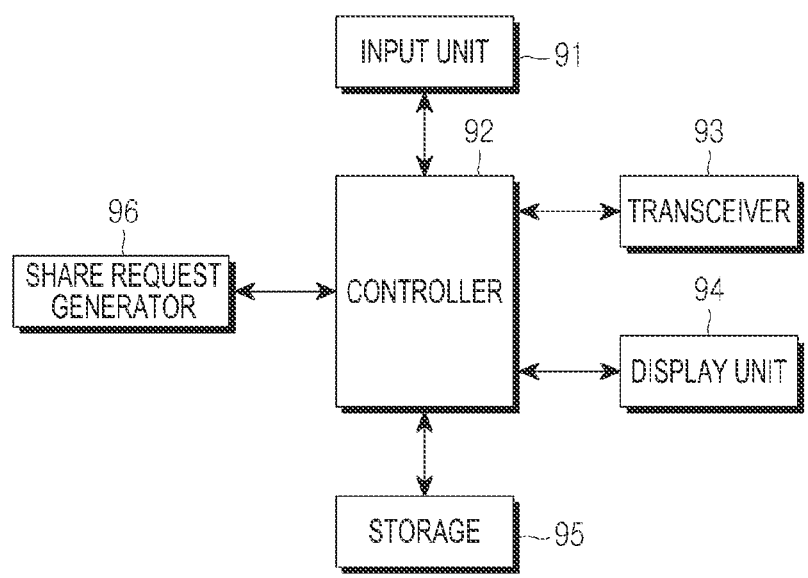
FIG. 9 is a Hock diagram of a client used for application sharing between clients under different system environments, according to an embodiment of the present invention.

FIG. 9 is a block diagram of a client used for application sharing between clients under different system environments, according to an embodiment.

The client used for automatic application sharing among a plurality of clients includes an input unit 91, a transceiver 92, a display unit 94, a storage 95, a share request generator 96, and a controller 92.

The transceiver 93 communicates with the sharing server.

The share request generator 96 generates an application share request, upon reception of a command to share an application. The share request includes operating system information of the requesting client, information regarding the application to be shared, and information regarding the at least one target client. The information regarding the application to be shared includes information about the title, identification ID, operating system, developer, address in which to access the application, and price of the application.

The controller 92 controls all component of the client. In an embodiment, the controller 92 controls the share request generator 96 to generate the application share request, if the command to share an application is entered, sends the application share request to the sharing server, and if receiving a share result from the sharing server, displays the share result to be displayed. The share result includes a result of sharing the application with each target client and information regarding the shared application.

The controller 92 also controls share request notification to be displayed if the share request notification that notifies that there has been a request to share an application is received from the sharing server, and upon reception of approval for the share request, notifies the sharing server of the approval and controls the application requested to be shared to be received from the sharing server.

The share request notification includes information regarding the requesting client and information regarding the application to be shared, and the information regarding the application to be shared includes information about the title, identification ID, operating system, developer, address in which to access the application, and price of the application.

The display unit 94 is comprised of an output means, such as LCD (Liquid Crystal Display), touch screen, etc., and outputs display content under control of the controller 62. In the embodiment, the display unit 94 displays the application share request notification and application share results.

The input unit 91 receives user inputs through an input cans, such as keyboard, mouse, touch screen, etc.

The storage 95 stores information required to operate the client.

In the embodiments, as described above, operations and configurations of the method and apparatus for automatically sharing an application among a plurality of clients are provided. While the present invention has been particularly shown and described with reference to embodiments thereof, it will be understood by those of ordinary skill in the art that various changes in form and details may be made therein without departing from the spirit and scope of the present invention as defined by the following claims.

REFERENCES

[1] Session Initiation Protocol (SIP)-Specific Event Notification, RFC 3265, URL: http://www.ietf.org/rfc/rfc3265.txt
[2] XML, Configuration Access Protocol, RFC 4825, RFC 4826, RFC 4827

[3] User Agent Profile, Open Mobile Alliance™ OMA-TS-UAProf-V2_0, URL: http://www.openmobilealliance.org
[4] "Push Access Protocol Specification", WAP Forum™ WAP-247-PAP, URL: http://www.openmobilealliance.org/
[5] "XML Document Management Specification", Open Mobile Alliance™ OMA-TS-XDM-Core-V2_1, URL: http://www.openmobilealliance.org/

The invention claimed is:

1. A method of automatically sharing an application among a plurality of clients, the method comprising a sharing server configured to:
   receive, from a requesting client, a share request signal for an application to be shared with a target client, the share request signal comprising information regarding an operating system of the requesting client;
   receive capability information of the target client;
   determine that the application requested to be shared is not compatible in the target client if determining that a first operating system of the target client is different from a second operating system of the requesting client based on the capability information;
   request and receive access information from the target client, the access information comprising credential information enabling access to an application provider of the target client;
   convert the share request signal into a format that is executable by the application provider of the target client and send the converted share request signal and the access information to the application provider to request the corresponding application which is compatible in the target client;
   replace the application to be shared with the compatible application received from the application provider;
   send the compatible application along with information regarding the received share request signal to the target client; and
   send, to the requesting client, a result of the application sharing comprising information included in the original share request signal and information regarding the replacement application.

2. The method of claim 1, wherein the share request comprises information regarding the second operating system, information regarding the application to be shared, and information regarding the target client.

3. The method of claim 2, wherein the information regarding the application to be shared comprises information about a title, identification, operating system, developer, address in which to access the application, and price of the application to be shared.

4. The method of claim 1, wherein if determining that the application requested to be shared is not compatible in the target client, requesting to provide the target client with the application, which is compatible in the target client, from an application provider of the target client comprises:
   requesting and receiving access information to access the application provider of the target client from the target client; and
   requesting to provide the target client with the application, which is compatible in the target client, from the application provider of the target client, using the access information.

5. The method of claim 1, wherein receiving capability information of the target client comprises:
   determining whether the target client approves the share request; and
   receiving the application to be shared if the target client approves the share request, and requesting and receiving the capabilities of the target client, including information of the first operating system, from a terminal capabilities manager server.

6. The method of claim 1, wherein the share request is received using XDCP (XDM Command Protocol).

7. The method of claim 1, wherein receiving capability information of the target client comprises:
   requesting the capability information of the target terminal from a terminal capabilities manager server in ccq-message (client capabilities query-message) of PAP (Push Access Protocol): and
   receiving the capability information of the target client in ccq-response.

8. An apparatus for automatically sharing an application among a plurality of clients, the apparatus comprising:
   a transceiver for receiving from a requesting client a share request signal for an application to be shared with a target client, and for receiving capability information of the target client, the share request signal comprising information regarding an operating system of the requesting client;
   a controller configured to determine that the application requested to be shared is not compatible in the target client if determining that a first operating system of the target client is different from a second operating system of the requesting client based on the capability information,
   request and receive access information from the target client, the access information comprising credential information enabling access to an application provider of the target client,
   convert the share request signal into a format that is executable by the application provider of the target client and send the converted share request signal and the access information to the application provider to request the corresponding application, which is compatible in the target client,
   replace the application to be shared with the compatible application received from the application provider;
   send the compatible application along with information regarding the received share request signal to the target client; and
   send, to the requesting client, a result of the application sharing comprising information included in the original share request signal and information regarding the replacement application.

9. The apparatus of claim 8, wherein the share request comprises information regarding the second operating system, information regarding the application to be shared, and information regarding at least one target client.

10. The apparatus of claim 9, wherein the information regarding the application to be shared comprises information about a title, identification, operating system, developer, address in which to access the application, and price of the application to be shared.

11. The apparatus of claim 8, wherein if determining that the application requested to be shared is not compatible in the target client, the controller is configured to request to provide the target client with the application, which is compatible in the target client, from an application provider of the target client, and
   wherein if determining that the application requested to be shared is not compatible in the target client, the controller is configured to request and receive access information to access the application provider of the target client from the target client, and request to provide the target client with the application, which is compatible in the target client, from the application provider of the target client, using the access information.

12. The apparatus of claim 8, wherein the controller is configured to determine whether the target client approves the share request, receive the application to be shared if the target client approves the share request, and request and receive information of the first operating system from a terminal capabilities manager server.

13. The apparatus of claim 8, wherein the share request is received using XDCP (XDM Command Protocol).

14. The apparatus of claim 8, wherein the controller is configured to request the capability information of the target terminal from the terminal capabilities manager server in ccq-message (client capabilities query-message) of PAP (Push Access Protocol) and receive the capability information of the target client in ccq-response.

15. A sharing method in a requesting client for automatic application sharing among a plurality of clients, the sharing method comprising:
receiving from a user a share request for providing a target client of the plurality of clients with a particular application;
generating an application share request message which corresponds to the received share request for the particular application;
sending the application share request message to a sharing server;
wherein the sharing server:
determines that the application requested to be shared is not compatible in the target client by determining that a first operating system of the target client is different from a second operating system of the requesting client based on received capability information;
requests and receives access information from the target client, the access information comprising credential information enabling access to an application provider of the target client;
converts the share request signal into a format that is executable by the application provider of the target client and sends the converted share request signal and the access information to the application provider to request the corresponding application which is compatible in the target client;
replaces the application to be shared with the compatible application received from the application provider;
and sends the compatible application along with information regarding the received share request signal to the target client;
receiving, from the sharing server, an application share result; and
displaying the application share result, which indicates if the operating systems of the target client and the at least one particular target client of the plurality of clients are compatible.

16. The sharing method of claim 15, wherein the application share request message comprises information regarding the client's operating system, information regarding the application to be shared, and information regarding the at least one particular target client.

17. The sharing method of claim 16, wherein the information regarding the application to be shared comprises information about a title, identification, operating system, developer, address in which to access the application, and price of the application to be shared.

18. The sharing method of claim 15, wherein the application share result further comprises information regarding an application share result at each target client and information regarding a shared application.

19. A sharing method in a target client for automatic application sharing among a plurality of clients, the sharing method comprising:
receiving from a sharing server a share request notification which notifies that there has been a share request for an application from a requesting client, the share request comprising information regarding an operating system of the requesting client;
displaying the share request notification;
notifying the sharing server that the share request is approved, based on an input of approval from a user; and
receiving from the sharing server the application requested to be shared;
wherein the sharing server:
determines that the application requested to be shared is not compatible in the target client by determining that a first operating system of the target client is different from a second operating system of the requesting client based on received capability information;
requests and receives access information from the target client, the access information comprising credential information enabling access to an application provider of the target client;
converts the share request signal into a format that is executable by the application provider of the target client and sends the converted share request signal and the access information to the application provider to request the corresponding application which is compatible in the target client;
replaces the application to be shared with the compatible application received from the application provider;
and sends the compatible application along with information regarding the received share request signal to the target client.

20. The sharing method of claim 19, wherein the share request notification comprises information regarding the client and information regarding the application to be shared.

21. The sharing method of claim 20, wherein the information regarding the application to be shared comprises information about a title, identification, operating system, developer, address in which to access the application, and price of the application to be shared.

22. A requesting client device to be used for automatically sharing an application among a plurality of clients, the requesting client device comprising:
a transceiver that communicates with a sharing server;
a display unit that displays an application share request notification and an application share result;
a controller configured to generate the application share request message when a command to share an application has been received,
send the application share request message to the sharing server, the application share request message comprising information regarding an operating system of the requesting client; control a share result to be displayed, when receiving the share result from the sharing server; control an application share request notification to be displayed upon receipt from the sharing server; and upon reception of approval for the share request, notify the sharing server of the approval and control the application requested to be shared to be received from the sharing server;

and wherein the sharing server:

determines that the application requested to be shared is not compatible in the target client by determining that a first operating system of the target client is different from a second operating system of the requesting client based on received capability information;

requests and receives access information from the target client, the access information comprising credential information enabling access to an application provider of the target client;

converts the share request signal into a format that is executable by the application provider of the target client and sends the converted share request signal and the access information to the application provider to request the corresponding application which is compatible in the target client;

replaces the application to be shared with the compatible application received from the application provider;

and sends the compatible application along with information regarding the received share request signal to the target client.

23. The client device of claim 22, wherein the application share request message comprises information regarding the first operating system, information regarding the application to be shared, and information regarding the at least one target client.

24. The client device of claim 23, wherein the information regarding the application to be shared comprises information about a title, identification, operating system, developer, address in which to access the application, and price of the application to be shared.

25. The client device of claim 22, wherein the share result further comprises information regarding an application share result at each target client and information regarding a shared application.

26. The client device of claim 22, wherein the share request notification comprises information regarding the application to be shared.

27. The client device of claim 26, wherein the information regarding the application to be shared comprises information about a title, identification, operating system, developer, address in which to access the application, and price of the application to be shared.

* * * * *